(12) United States Patent
McMahon et al.

(10) Patent No.: US 11,703,071 B2
(45) Date of Patent: Jul. 18, 2023

(54) JOINT FOR AN AIRCRAFT ASSEMBLY

(71) Applicants: AIRBUS OPERATIONS LIMITED, Bristol (GB); AIRBUS OPERATIONS GMBH, Hamburg (DE); AIRBUS OPERATIONS SAS, Toulouse (FR)

(72) Inventors: Andrew McMahon, Bristol (GB); Saif Rafique, Bristol (GB); Abishek Ramesh, Bristol (GB); Oliver Marks, Bristol (GB); Julien Laverne, Bristol (GB); Umberto Polimeno, Bristol (GB); John Hobday, Bristol (GB); Andrew Henstridge, Bristol (GB); Jöerg Schwickert, Bristol (GB); Raul-Jose Gomez Vizcaino, Bristol (GB)

(73) Assignees: AIRBUS OPERATIONS LIMITED, Bristol (GB); AIRBUS OPERATIONS GmbH, Hamburg (DE); AIRBUS OPERATIONS (SAS), Toulouse (FR)

(*) Notice: Subject to any disclaimer, the term of this patent is extended or adjusted under 35 U.S.C. 154(b) by 569 days.

(21) Appl. No.: 16/832,249

(22) Filed: Mar. 27, 2020

(65) Prior Publication Data
US 2020/0309174 A1    Oct. 1, 2020

(30) Foreign Application Priority Data
Mar. 28, 2019    (GB) .................................... 1904353

(51) Int. Cl.
*F16B 5/02*    (2006.01)
*B64C 1/06*    (2006.01)
(Continued)

(52) U.S. Cl.
CPC .............. *F16B 5/025* (2013.01); *B64C 1/069* (2013.01); *F16B 11/008* (2013.01); *B64C 1/26* (2013.01)

(58) Field of Classification Search
CPC .......... F16B 5/01; F16B 5/025; F16B 11/008; F16B 37/044; B64C 1/069; B64C 1/12
See application file for complete search history.

(56) References Cited

U.S. PATENT DOCUMENTS 2,820,499 A    1/1958 Schaaf
3,016,578 A  * 1/1962 Rohe .................... F16B 5/01
                                                        428/116
(Continued)

FOREIGN PATENT DOCUMENTS

EP    0 415 505    3/1991
EP    3 059 459    8/2016
(Continued)

OTHER PUBLICATIONS

Examination Report for European Application No. 20 165 734.3, eight pages, dated Oct. 5, 2021.
(Continued)

*Primary Examiner* — Daniel J Wiley
(74) *Attorney, Agent, or Firm* — Nixon & Vanderhye P.C.

(57) ABSTRACT

An assembly-ready joint for an aircraft assembly is disclosed. The joint includes a first joint part having a spigot. The joint also has a second joint part with a housing. A floating socket is in an interior of the housing. The second joint part receives the spigot in the floating socket. The joint is arranged to receive a curable medium, such as curable resin, in the interior to contract between the housing and the floating socket.

28 Claims, 6 Drawing Sheets

(51) Int. Cl.
*F16B 11/00* (2006.01)
*B64C 1/26* (2006.01)

(56) References Cited

U.S. PATENT DOCUMENTS

| | | | | | |
|---|---|---|---|---|---|
| 3,019,865 | A | * | 2/1962 | Rohe | F16B 5/01 428/116 |
| 3,339,609 | A | * | 9/1967 | Cushman | B64C 1/12 264/261 |
| 3,504,723 | A | * | 4/1970 | Cushman | F16B 5/025 411/116 |
| 3,510,916 | A | * | 5/1970 | Phelan | B29C 66/131 249/97 |
| 3,621,557 | A | * | 11/1971 | Cushman et al. | B64C 1/12 411/176 |
| 3,884,006 | A | * | 5/1975 | Dietlein | F16B 5/01 411/968 |
| 4,428,705 | A | * | 1/1984 | Gelhard | F16B 37/122 411/103 |
| 4,812,193 | A | * | 3/1989 | Gauron | B29C 66/474 264/261 |
| 4,973,208 | A | * | 11/1990 | Gauron | F16B 5/025 411/258 |
| 5,240,543 | A | * | 8/1993 | Fetterhoff | F16B 5/01 428/116 |
| 5,378,099 | A | * | 1/1995 | Gauron | F16B 5/01 411/258 |
| 5,632,582 | A | * | 5/1997 | Gauron | F16B 5/01 411/258 |
| 8,359,715 | B2 | | 1/2013 | Turner et al. | |
| 9,279,438 | B2 | * | 3/2016 | Tandjung | F16B 5/0614 |
| 9,446,488 | B2 | | 9/2016 | Coronado | B23P 19/04 |
| 9,822,808 | B2 | * | 11/2017 | Rajeev | F16B 5/01 |
| 10,377,087 | B2 | * | 8/2019 | Kögl | B29C 65/48 |
| 2007/0297869 | A1 | | 12/2007 | Kunda | |
| 2013/0186552 | A1 | | 7/2013 | Asahara et al. | |
| 2016/0001501 | A1 | | 1/2016 | Kögl | |

FOREIGN PATENT DOCUMENTS

| | | |
|---|---|---|
| EP | 3 069 988 | 9/2016 |
| EP | 3 130 534 | 2/2017 |
| WO | 2009/089317 | 7/2009 |

OTHER PUBLICATIONS

Extended European Search Report for European Application No. 20165734.3, 10 pages, dated Sep. 4, 2020.
Combined Search and Examination Report for GB Application No. 1904353.8, dated Sep. 13, 2019, 7 pages.
Communication Pursuant to Article 94(3) EPC, for Application No. EP 20165734.3, nine pages, dated Nov. 24, 2022.

* cited by examiner

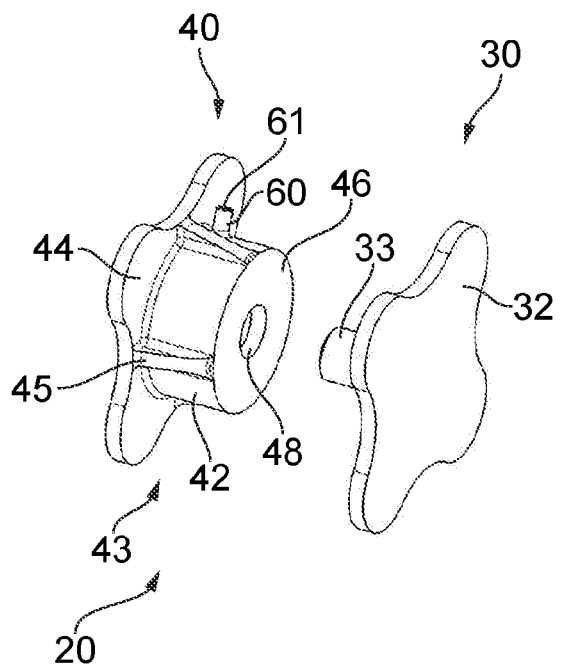
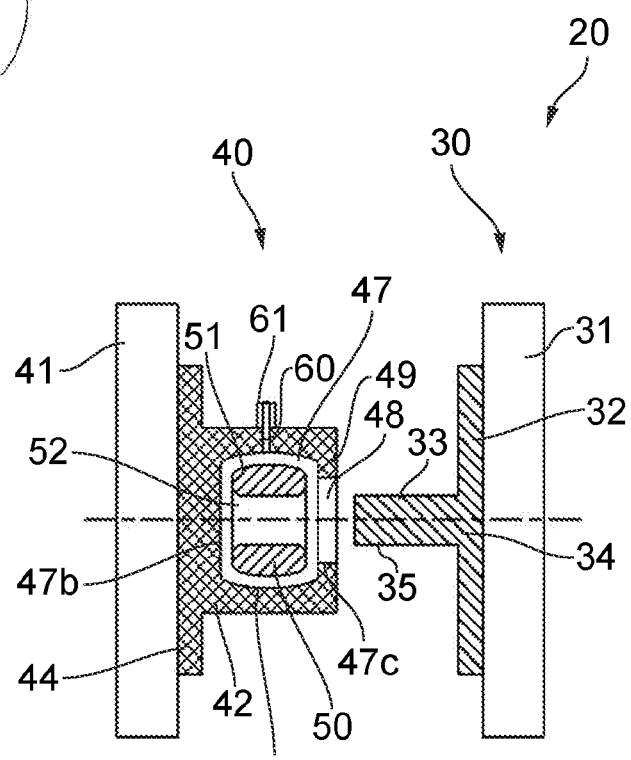
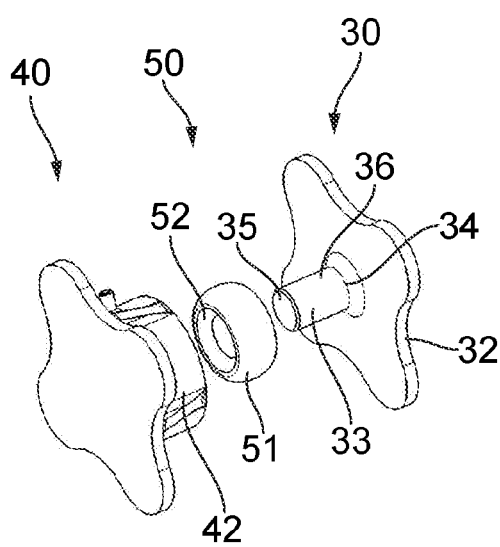

JOINT FOR AN AIRCRAFT ASSEMBLY

CROSS RELATED APPLICATION

This application claims priority to United Kingdom (GB) Patent Application 1904353.8, filed Mar. 28, 2019, the entire contents of which is hereby incorporated by reference.

FIELD OF THE INVENTION

The present invention relates to an assembly-ready joint for an aircraft assembly. The present invention also relates to a joint part for joining with another joint part to form a joint for an aircraft, a joint construction for an aircraft assembly, an aircraft assembly, an aircraft, and a method of forming a joint for an aircraft assembly.

BACKGROUND OF THE INVENTION

Aircraft assemblies, such as wing assemblies are typically formed from a large number of components. The necessity to assemble large number of components leads to a complex structure. Typically, such a complex structure leads to a build-up of manufacturing tolerances. Such a tolerance build-up can lead to a misalignment of components to be assembled. This can lower the rate of assembly and reduce manufacturing efficiency.

A tolerance build-up can lead to a substantive misalignment of components at joints. One such area where a build-up of tolerances is known to have an effect on the final fit of components is the root joint of spars of a wingbox. It is therefore desirable to minimise the effect of the tolerance build-up at joints of the assembly, for example at the root joint of the spars.

SUMMARY OF THE INVENTION

According to an aspect of the invention, there is provided an assembly-ready joint for an aircraft assembly comprising: a first joint part comprising a spigot; a second joint part comprising a housing and a floating socket in an interior of the housing; wherein the second joint part is arranged to receive the spigot in the floating socket; and to receive a curable medium in the interior to contact between the housing and the floating socket.

By 'assembly-ready' is meant two or more components that are arranged to be assembled, or are at least partially assembled.

With the above arrangement, it is possible to absorb tolerance build-up by allowing the floating socket to be offset in the housing.

The housing may comprise an inlet to the interior through which the curable medium is arranged to be received.

The inlet may be an injection port in the housing. As such, a curable medium may be straightforwardly received in the housing.

The curable medium may be a curable resin, such as an epoxy sealant. The curable resin may be a curable shim material, a curable putty or a curable sealant.

The floating socket may comprise a spigot-receiving bore.

The spigot-receiving bore may comprise a chamfer.

The chamfer assists alignment of the floating socket and spigot when the components are brought together.

The floating socket may be a sleeve. The sleeve may be a ring.

Prior to the curable medium being cured in the interior, the floating socket may be movable in the interior of the housing in a direction at least substantially perpendicular to an axis of the bore.

Prior to the curable medium being cured in the interior, the floating socket may be movable in the interior of the housing in a direction at least substantially parallel to an axis of the bore.

The interior of the housing may comprise a chamber receiving the floating socket. A dimension of the chamber may be greater than a dimension of the socket.

The second joint part may be arranged to receive a curable medium in the interior to contact substantially around a periphery of the floating socket.

The assembly-ready joint may comprise an opening in the housing through which the spigot is arranged to extend to be received in the floating socket.

A dimension of the opening may be greater than a dimension of the spigot.

The opening may define an outlet through which air in the interior is able to flow from the interior when sealant is injected into the interior.

The assembly-ready joint may comprise a shoulder extending around the opening retaining the sleeve in the interior of the housing.

Prior to the curable medium being cured in the interior, the floating socket may be free to float at least 2 mm in the housing.

The housing may be configured to restrict movement of the floating socket in the housing.

An axis of the bore may be arranged to be moved offset from an axis of the opening The assembly-ready joint may comprise protrusions extending in the interior arranged to restrict rotation of the floating socket in the interior of the housing.

The protrusions may extend from the floating socket.

The assembly-ready joint may comprise recesses in which the protrusions are received.

An advantage of the above arrangement is that rotation of the floating socket about its axis is restricted.

The spigot may be tapered.

According to a further aspect of the invention, there is provided a joint construction for an aircraft assembly comprising: a first joint part comprising a spigot; a second joint part comprising a housing and a socket in an interior of the housing, with the spigot received in the floating socket; and a cured medium in the housing contacting between the housing and the socket.

The cured medium may at least substantially surround a periphery of the socket.

According to a further aspect of the invention, there is provided a joint part for joining with another joint part to form a joint for an aircraft, the joint part comprising: a housing and a floating socket in an interior of the housing; wherein the joint part is arranged to receive a spigot of the another joint part in the floating socket; and arranged to receive a curable medium in the housing to contact between the housing and the floating socket.

According to a further aspect of the invention, there is provided an aircraft assembly comprising the joint part as described above, and a spigot configured to be received by the joint part.

According to a further aspect of the invention, there is provided an aircraft comprising a joint construction as described above. The joint construction may form part of a root joint.

According to a further aspect of the invention, there is provided a method of forming a joint for an aircraft assembly, the method comprising: aligning a first joint part comprising a spigot with a second joint part comprising a housing and a floating socket in an interior of the housing; inserting the spigot into the floating socket; and curing a curable medium in the interior of the housing to contact between the housing and the floating socket.

The method may comprise, following inserting the spigot into the floating socket, injecting the curable medium in the interior of the housing.

According to an aspect of the invention, there is provided a joint for an aircraft assembly comprising: a housing on a first component, the housing having a floating socket; a spigot received by the floating socket, and a cured medium in the housing adhering between the housing and the floating socket.

BRIEF DESCRIPTION OF THE DRAWINGS

Embodiments of the invention will now be described with reference to the accompanying drawings, in which:

FIG. 3 is a perspective view of an assembly ready joint prior to assembly of first and second joint parts for joining two components of the aircraft assembly;

FIG. 4 is a schematic cross-sectional view of the joint shown in FIG. 3;

FIG. 5 is an exploded perspective view of the assembly ready joint shown in FIG. 3;

DETAILED DESCRIPTION OF EMBODIMENT(S)

Figure 1:
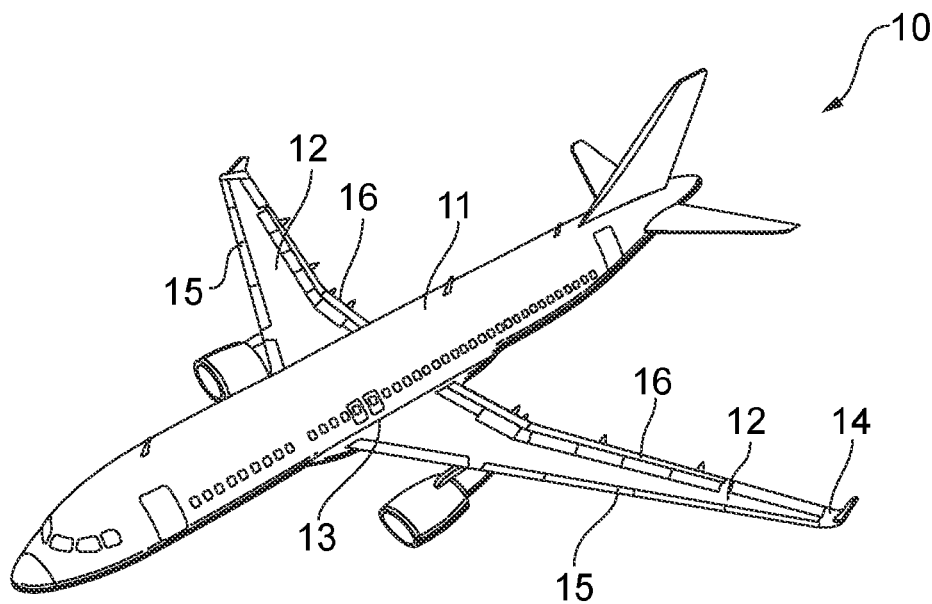
FIG. 1 is a perspective view of an aircraft.
Figure 2:
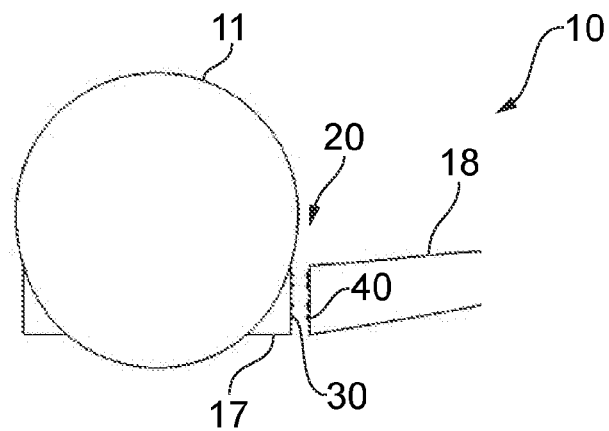
FIG. 2 is a schematic view of a root joint of a wingbox of the aircraft shown in FIG. 1.
Figure 6:
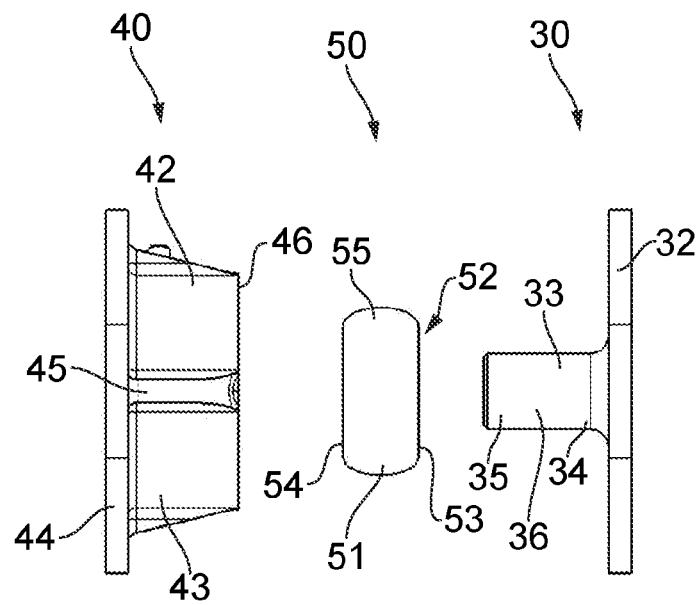
FIG. 6 is an exploded side view of the assembly ready joint shown in FIG. 3.

An aircraft 10 is shown in FIG. 1. The aircraft 10 includes a fuselage 11. A wing assembly including wings 12 extends from the fuselage 11. The wing assembly includes a wing box. It will be appreciated that the fuselage 11 and wings 12 may take a variety of different platform shapes and profiles depending on the particular application. Each wing 12 has a wing root at the fuselage 11, and a wing tip 14 at a distal end to the fuselage 11. The wing 12 has a leading edge 15 and a trailing edge 16.

The fuselage 11 has a longitudinal axis. The longitudinal axis defines an "x-direction" as shown in FIG. 1. The "x-direction" of the aircraft 10 relates to a roll axis direction. A spanwise direction of the aircraft 10 is defined between the wing tips 14. The spanwise direction defines a "y-direction". The spanwise direction relates to a pitch axis direction. A "z-direction" of the aircraft 10 extends perpendicular to the "x-direction" and "y-direction". The "z-direction" relates to a yaw axis direction. The aerodynamic lift force which acts through the centre of pressure acts substantially in the z-direction.

A centre wing box 17, and left and right wing sections 18 are assembled together. Root joints 19 connect the wing sections 18 to the centre wing box 17. Joints 20 form the root joint 19 between the centre wing box 17 and corresponding wing section 18. The joints 20 are typically connected between spars (not shown) to provide a structural interface.

Referring now to FIGS. 3 to 6, one of the joints 20 for forming the root joint 19 will be described. Although the joint 20 is described with reference to the root joint 19, it will be understood that the joint 20 may be used in an alternative application, for example for joining two components in another part of the aircraft assembly, or in an alternative configuration.

The joint 20 comprises a first joint part 30 and a second joint part 40. The first joint part 30 and the second joint part 40 are brought together to form an assembled joint. As shown in FIG. 4, the first joint part 30 is mounted to a first component 31 and the second joint part 40 is mounted to a second component 41. The first and second components 31, 41 may be sub-assemblies of an aircraft assembly. The first and second joint parts 30, 40 may be integrally formed with the first and second components 31, 41 respectively.

The first joint part 30 comprises a base 32. Fixings (not shown) mount the base 32 to the first component 31. Alternatively, the first component 31 forms the base 32. A spigot 33 upstands from the base 32. The spigot 33 is a pin. The spigot 33 is substantially cylindrical, although alternative shapes may be used. The spigot has a base end 34 and a free end 35. The free end 35 is distal from the base 32. The spigot 33 has a side surface 36. The spigot 33 is tapered. The taper of the spigot 33 is a small angle. The spigot 33 tapers from the base end 34 to the free end 35. The taper of the spigot 33 aids location of the spigot 33 in the second joint part 40. The first joint part 30 may be formed from any suitable material, for example titanium or aluminium.

The second joint part 40 includes a housing 42 and a floating socket 50. The floating socket 50 is in an interior of the housing 42. The floating socket 50 is retained by the housing 42. The floating socket 50 is shown in an exploded view in FIGS. 5 and 6, however it will be understood that the floating socket 50 is permanently retained in the housing 42. For example, the housing 42 and floating socket 50 may be 3D printed, for example by additive layer manufacturing, or by another manufacturing process. In another arrangement, the housing 42 is formed by two or more portions which may be permanently or releasably attached to each other to allow for insertion (and also possibly removal) of the floating socket 50 from the housing 42.

The housing 42 comprises a body 43 and a mount 44. The mount 44 mounts the body 43 to the second component 41. The second component 41 may form the mount 44. Fixings (not shown) attach the mount 44 to the second component 41. Ribs 45 on the exterior of the body 43 provide structural strength to the body 43. The housing 42 has a joint face 46. The joint face 46 is distal from the mount 44. The joint face 46 is planar, although other arrangements are possible. The housing may be formed from any suitable material, for example titanium or aluminium.

The housing 42 includes a chamber 47. The chamber 47 defines the interior of the housing 42. The chamber 47 is formed with a peripheral wall 47a and a base wall 47b. An end wall 47c of the chamber 47 opposes the base wall 47b.

The end wall 47c defines the joint face 46. An opening 48 is formed in the housing 42. The opening 48 is in the end wall 47c. The opening 48 extends through the end wall 47c. The opening 48 extends from the joint face 46 to the chamber 47. The opening 48 provides access to the floating socket 50 in the chamber 47. The opening 48 has an opening axis. The end wall 47c defines a shoulder 49. The shoulder 49 defines the rim of the opening 48. The shoulder 49 retains the floating socket 50 in the chamber 47.

The peripheral wall 47a of the chamber 47 has a generally circular profile. The peripheral wall 47a has an arcuate profile surface between the base wall 47b and end wall 47c, as shown in FIG. 4. The arcuate surface aids in restricting the floating socket 50 from jamming in the chamber 47. The chamber 47 has a diametric width. The diametric width is measured generally perpendicular to the axis of the opening 48. The chamber 47 has a depth. The chamber depth is between the base wall 47b and the end wall 47c. The chamber depth is at least substantially parallel to the axis of the opening 48.

The opening 48 has a diametric width. The opening 48 is defined by the rim. The opening 48 is arranged to allow insertion of the spigot 33 into the chamber 47.

An inlet 60 is provided to the chamber 47. The inlet 60 is configured to allow the insertion of a curable medium into the chamber 47. The inlet 60 comprises an injection port 61. The injection port 61 communicates between external of the housing 42 and the chamber 47. The injection port 61 is configured to receive an injection tool 70 as shown in FIG. 8b. The injection tool 70 provides for the injection of a curable medium. The curable medium is an epoxy resin. Alternative curable mediums may be used.

The floating socket 50 is retained in the chamber 47. The floating socket 50 is a ring. The floating socket 50 defines a sleeve with a spigot receiving bore 52. The spigot receiving bore 52 extends through the sleeve 51. In an alternative arrangement, the bore 52 extends partway into the sleeve 51. The sleeve 51 is substantially torus-shaped. The diameter of the bore 52 substantially corresponds the diameter of the spigot 33. The floating socket 50 acts as a bush. The sleeve 51 has a front side 53 and a rear side 54. The sleeve 51 has a peripheral surface 55. The peripheral surface 55 defines an outer circumference of the sleeve 51. The bore 52 defines a bore axis. The bore axis 52 is defined centrally in the floating socket 50.

The overall dimensions of the floating socket 50 are smaller than the internal dimensions of the chamber 47. The diametric width of the chamber 47 is greater than the diametric width of the floating socket 50. The depth of the chamber 47 is greater than the thickness of the floating socket 50. The sleeve 51 is therefore free to float in the housing 42. The floating socket 50 is able to move in a radial direction, in an axial direction and to rotate about its axis.

Figure 7:
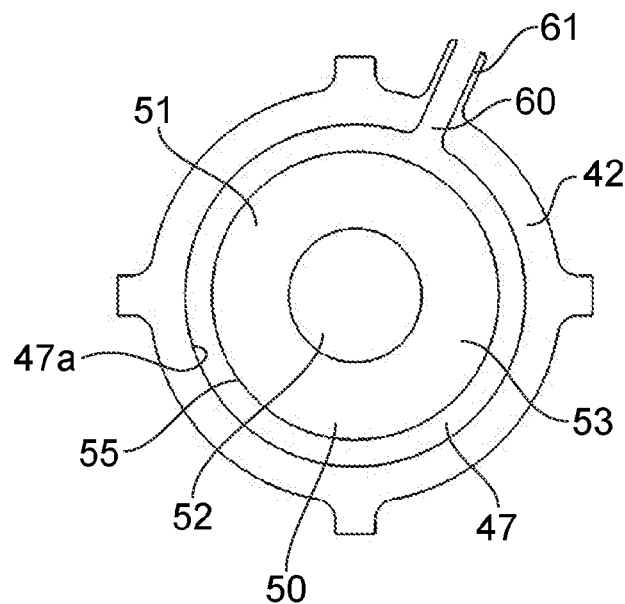
FIG. 7 is a cross-sectional front view of the second part of the assembly ready joint shown in FIG. 3.

The floating socket 50 is formed as a one-piece component. The floating socket 50 is formed from a rigid material. The floating socket 50 may be bronze. The floating socket may be an alternative material, for example titanium or aluminium. A gap is formed between the floating socket 50 and the walls of the chamber 47. The diametric gap is shown in FIG. 7. It will be understood that the sleeve 51 is free to move in the chamber 47 to abut the walls 47a-c of the housing 42. The axis of the bore 52 may therefore be moved offset from the axis of the opening 48. The injection port 61 fluidly communicates with the chamber 47. The second joint part 40 may include an outlet which fluidly communicates the chamber with external to the housing 42. The opening 48 may act as the outlet.

Figure 8A:
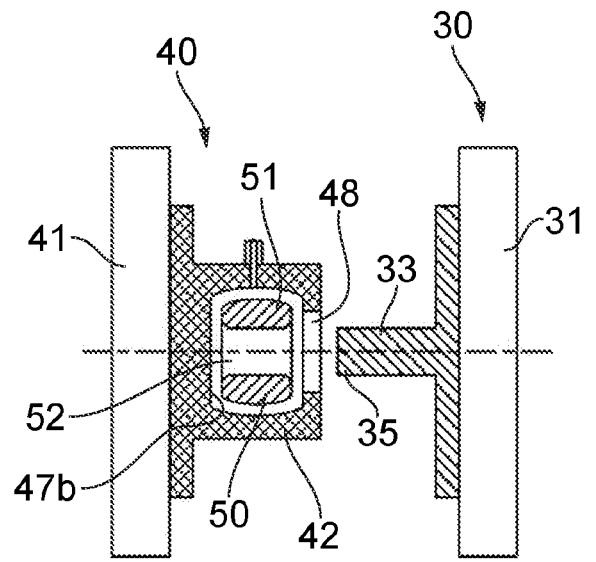
FIGS. 8a to 8c show a method of assembly of the joint shown in FIGS. 3 to 7.
Figure 8B:
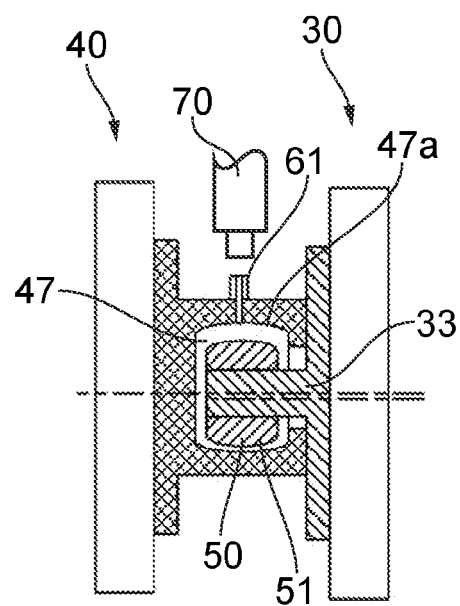
Figure 8C:
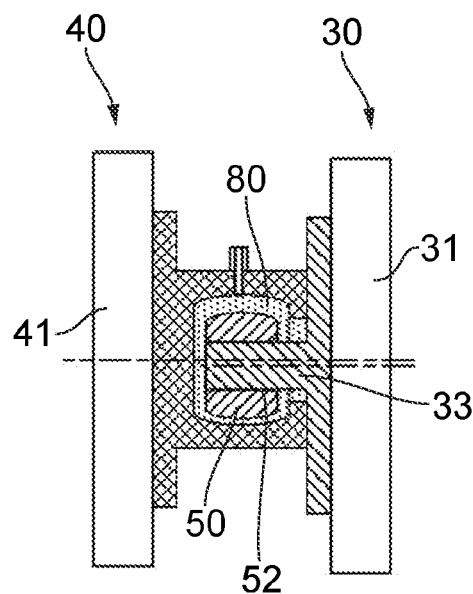

Referring now to FIGS. 8a, 8b and 8c, assembly of the joint 20 will now be described. The joint 20 is initially arranged with the second joint part 40 spaced from the first joint part 30. At this stage, the floating socket 50 is free to move in the housing 42. The housing 42 restrains movement of the floating socket 50.

The first and second joint parts 30, 40 are brought together. The spigot 33 is aligned with the opening 48. It will be understood that the diameter of the opening 48 is greater than the diameter of the spigot 33. The first and second components 31, 41 are brought together with the spigot free end 35 of the spigot 33 being inserted into the housing 42. The free end 35 of the spigot 33 is inserted through the opening 48.

When the free end 35 of the spigot 33 is inserted into the housing 42, the spigot 33 is brought into contact with the floating socket 50. The free end 35 of the spigot 33 is inserted into the bore 52 of the floating socket 50.

The spigot axis and opening axis may be misaligned. Similarly, the bore axis and opening axis may be misaligned. The spigot 33 is received by the bore 52. The bore 52 is chamfered. As such, the free end 35 of the spigot 33 contacts the chamfer to aid alignment of the floating socket 50 and spigot 33. The spigot 33 is therefore inserted into the sleeve 51 of the floating socket 50 to cause alignment of the sleeve 51 and the spigot 33. The taper of the spigot 33 aids to locate the spigot 33 in a close contact with the sleeve 51 when the first and second parts 30, 40 are brought fully together. The sleeve 51 acts as a bush of the spigot 33. When the first and second parts 30, 40 are brought together the spigot 33 may hold the floating socket 50 in an offset position in the housing 42.

The length of the spigot 33 is less than the depth of the opening 48 and chamber 47. This helps to ensure that the free end 35 of the spigot 33 does not abut against the base wall 47b of the chamber 47.

As shown in FIG. 8b, when the spigot 33 is received by the sleeve 51, a peripheral gap is formed around the floating socket 50, between the floating socket 50 and the peripheral wall 47a of the chamber 47. The spigot 33 and floating socket 50 are offset from the housing 42.

The injection tool 70 is brought into communication with the injection port 61. A curable medium, such as an epoxy resin, is injected into the housing 42. The curable resin flows into the chamber 47. The curable medium 80 flows around the floating socket 50. The curable medium 80 contacts between the chamber walls 47a, 47b, 47c and the floating socket 50. The curable medium 80 fills the gap between the housing 42 and the sleeve 51. The curable medium 80 fills the chamber 47. The curable medium 80 flows through the opening 48, acting as an outlet.

Once a quantity of curable medium 80 has been injected to fill the chamber 47 injection of the curable medium is stopped. The curable medium 80 covers the sleeve 51. The curable medium 80 at least substantially fills the gap between the floating socket 50 and the housing 42. The curable medium 80 is used to adhere the floating socket 50 with the housing 42.

The curable medium 80 is then cured, as shown in FIG. 8c. The curable medium 80 bonds the sleeve 51 in the housing 42. As such, the position of the floating socket 50 in the housing 42 is fixed. The joint 20 is then formed in this assembled condition. As such, the joint 20 is able to account for misalignment of the first and second joint parts 30, 40. The floating socket 50, and therefore the bore axis 52, is therefore fixed. It will be appreciated that the spigot 33 may be removed, and the position of the bore 52 in the housing 42 will be retained.

Figure 9:
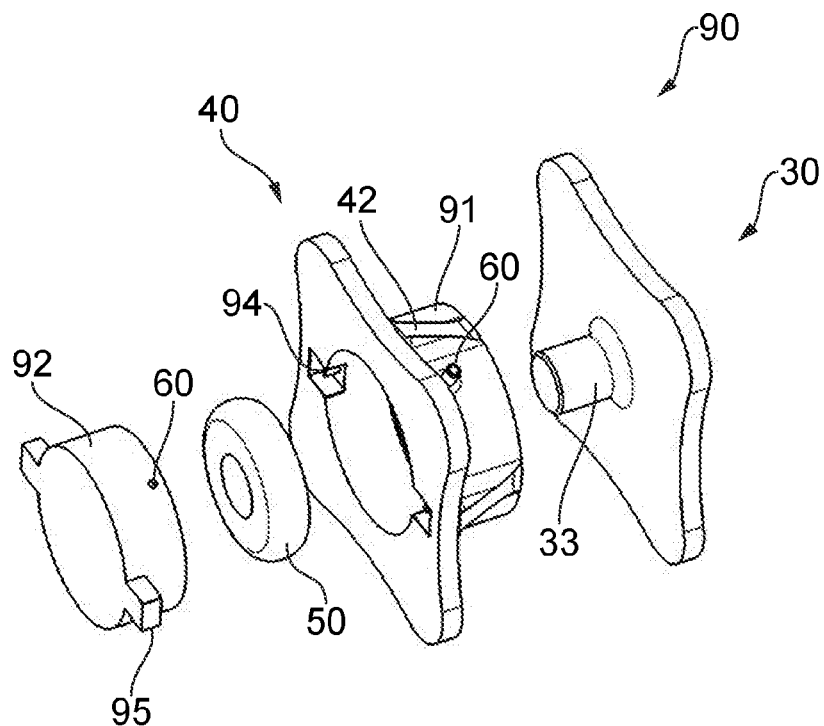
FIG. 9 shows an exploded perspective view of another assembly-ready joint.
Figure 10:
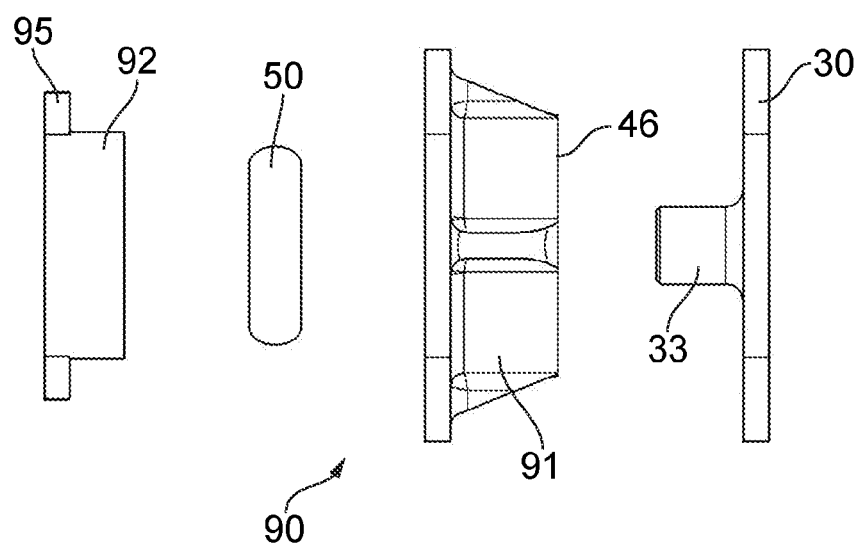
FIG. 10 shows an exploded side view of the assembly ready joint of FIG. 9.

Although the housing is formed in the above described in embodiment as a one-piece component, it will be understood that the housing may be two or more portions which are assembled together. In such an arrangement, the floating socket 50 may be insertable or removable from the housing. Such an arrangement is shown in FIGS. 9 and 10. The arrangement of this embodiment is generally the same as that described above and so a detailed description will be omitted.

In this embodiment, the joint 90 comprises the first joint part 30 including the spigot 33, and the second joint part 40 including the housing 42 holding the floating socket 50. The housing 42 includes a first housing portion 91 and a second housing portion 92. The second housing portion 92 is received by the first housing portion 91. When the second housing portion 92 is removed from the first housing portion 91, the chamber 47 is accessible to insert the floating socket 50 into the chamber 47. Attachment 94 on the first housing portion 91 is attached with attachments 95 on the second housing portion 92 to fix the first and second housing portions 91, 92 together. When assembled, the housing 91 prevents removal of the floating socket 50 from the chamber 47.

In this embodiment, the second housing portion 92 is received on a rear side of the housing 42, that is distal from the joint face 46. As such, when the second joint part 40 is mounted to the second component 41 (not shown) the mounting of the second component 41 and the second joint part 40 acts as a failsafe against the second housing portion 92 becoming detached from the first housing portion 91.

Figure 11:
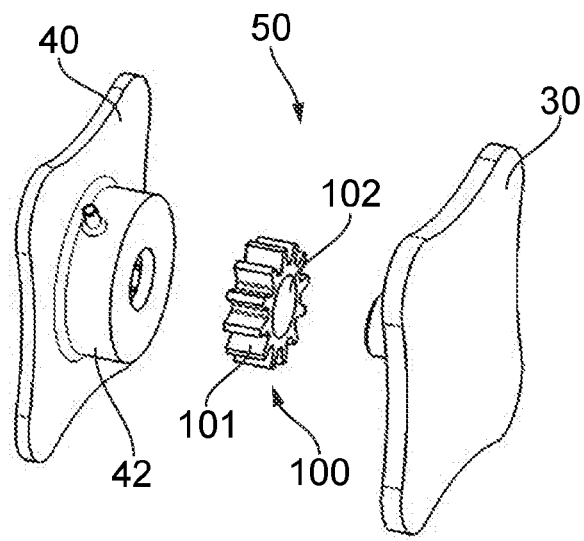
FIG. 11 shows an exploded perspective view of another assembly-ready joint.
Figure 12:
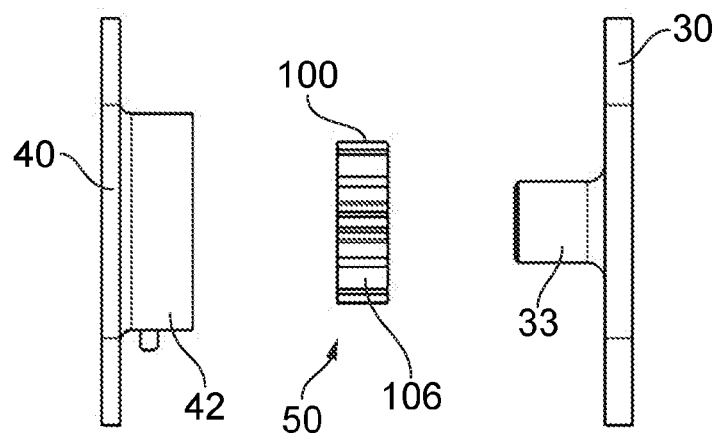
FIG. 12 shows an exploded side view of the assembly-ready joint of FIG. 11.
Figure 13:
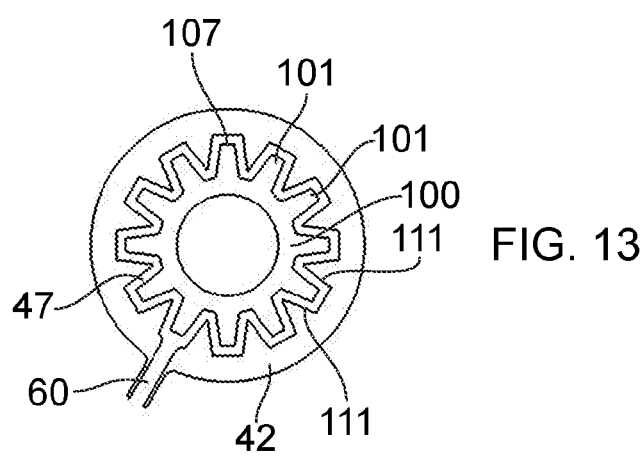
FIG. 13 shows a cross-sectional front view of a second part of the assembly-ready joint of FIG. 11.

An alternative arrangement is shown in FIGS. 11 to 13. The arrangement in FIGS. 11 to 13 comprises a one-part housing or multiple part-housing as described above. The arrangement of this embodiment generally corresponds to the embodiments described above and so a detailed description will be omitted herein, and reference numerals for corresponding features will be retained.

In the embodiment shown in FIGS. 11 to 13, the floating socket 50 comprises a sleeve 100 with protrusions 101. The sleeve 100 comprises a bore 102. The bore 102 may protrude fully or part way through the sleeve 100. The bore 102 is substantially cylindrical and is configured to receive the spigot 33 of the first joint part 30. The floating socket is shown in FIGS. 11 and 12 in an exploded arrangement with the housing 42, however it will be understood that the floating socket 50 is retained in the housing 42.

The protrusions 101 are teeth 105. The teeth 105 extend radially. The teeth 105 are formed on a peripheral side 106 of the sleeve 100. The teeth 105 are between the front and rear sides of the sleeve 100. Although in the shown embodiment the protrusions are formed by the teeth 105, it will be understood that alternative protrusion arrangements may be formed. Furthermore, the number of protrusions may vary. The teeth 105 are spaced around the periphery of the sleeve 100. The teeth 105 extend coaxially with the axis of the bore 102. The teeth 105, acting as protrusions are received in corresponding recesses 110 in the housing 42. The recesses 110 form the peripheral wall of the chamber 47. The recesses 110 are spaced around the chamber 47. Faces of the recesses 110 are spaced from the contact faces of the teeth 105. That is, the dimensions of the recesses 110 are greater than the dimensions of the protrusions 101. Such an arrangement is shown in FIG. 13.

As described above, the dimensions of the chamber 47 are greater than the peripheral dimensions of the floating socket 50. As such, the protrusions 101 are smaller than the recesses 110. The diametric width of the sleeve 100 between opposing tooth ends 107 is less than the diametric distance between the opposing recess spaces of the chamber 47. As such, the sleeve 100 is able to float in the chamber 47. The protrusion arrangement restricts rotation of the sleeve 100 in the chamber 47. A limited amount of rotation is provided for, however the rotation of the sleeve 100 in the housing 42 is restricted.

When the uncured medium is injected into the chamber 47, as described beforehand the uncured medium fills the gaps between the sleeve 100 and the chamber walls. The uncured medium flows in the recesses 110 and contacts between the recess walls 111 and the teeth 105, acting as protrusions. As such, when the uncured medium is cured then the position of the floating socket 50 with respect to the housing 42 is fixed. Relative movement of the sleeve and housing is prevented.

Although in the above described embodiments the joint is described with reference to an aircraft, it will be understood that the joint may be used with alternative assemblies.

Where the word 'or' appears this is to be construed to mean 'and/of' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. An assembly-ready joint for an aircraft assembly comprising:
   a first joint part comprising a spigot;
   a second joint part comprising a housing and a floating socket in an interior of the housing;
   wherein the floating socket defines a sleeve with a spigot-receiving bore extending through the sleeve;
   wherein the second joint part is arranged to be brought together with the first joint part having the spigot such that the spigot is inserted in the spigot-receiving bore to align the spigot with the sleeve; and to receive a curable medium in the interior of the housing to contact between the housing and the floating socket.

2. The assembly-ready joint of claim 1, wherein the housing comprises an inlet to the interior through which the curable medium is arranged to be received.

3. The assembly-ready joint of claim 2, wherein the inlet is an injection port in the housing.

4. The assembly-ready joint of claim 1, wherein the spigot-receiving bore comprises a chamfer.

5. The assembly-ready joint of claim 4, wherein, prior to the curable medium being cured in the interior, the floating socket is movable in the interior of the housing in a direction perpendicular or parallel to an axis of the spigot-receiving bore.

6. The assembly-ready joint of claim 5, wherein the interior of the housing comprises a chamber receiving the floating socket, and wherein a dimension of the chamber is greater than a dimension of the socket.

7. The assembly-ready joint of claim 1, wherein the second joint part is arranged to receive a curable medium in the interior to contact substantially around a periphery of the floating socket.

8. The assembly-ready joint of claim 1, comprising an opening in the housing through which the spigot is arranged to extend to be received in the floating socket.

9. The assembly-ready joint of claim 8, wherein a dimension of the opening is greater than a dimension of the spigot.

10. The assembly-ready joint of claim 9, wherein the opening defines an outlet through which air in the interior is able to flow from the interior when sealant is injected into the interior.

11. The assembly-ready joint of claim 8, comprising a shoulder extending around the opening retaining the socket in the interior of the housing.

12. The assembly-ready joint of claim 8, wherein an axis of the bore is arranged to be moved offset from an axis of the opening.

13. The assembly-ready joint of claim 1 wherein, prior to the curable medium being cured in the interior, the floating socket is free to float at least 2 mm in the housing.

14. The assembly-ready joint of claim 1, wherein the housing is configured to restrict movement of the floating socket in the housing.

15. The assembly-ready joint of claim 1, comprising protrusions extending in the interior arranged to restrict rotation of the floating socket in the interior of the housing.

16. The assembly-ready joint of claim 15, wherein the protrusions extend from the floating socket.

17. The assembly-ready joint of claim 15, comprising recesses in which the protrusions are received.

18. The assembly-ready joint of claim 1, wherein the spigot is tapered.

19. A joint construction for an aircraft assembly comprising the assembly-ready joint of claim 1, wherein the spigot is received in the floating socket;
and further comprising a cured medium in the housing contacting between the housing and the socket.

20. The joint construction of claim 19, wherein the joint construction is part of an aircraft root joint.

21. The assembly-ready joint of claim 1, wherein the bore is cylindrical.

22. The assembly-ready joint of claim 1, wherein the bore has a diameter and the spigot has a diameter, and the diameter of the bore corresponds to the diameter of the spigot.

23. A joint part for joining with another joint part to form a joint of an aircraft, the joint part comprising:
a housing; and
a floating socket in an interior of the housing;
wherein the floating socket defines a sleeve with a spigot-receiving bore extending through the sleeve;
wherein the joint part is arranged to be brought together with another joint part having a spigot such that the spigot is inserted in the;
spigot-receiving bore to align the spigot with the sleeve; and arranged to receive a curable medium in the housing to contact between the housing and the floating socket.

24. The joint part of claim 23, wherein the bore is cylindrical.

25. The joint part of claim 23, wherein the bore has a diameter and the spigot has a diameter, and the diameter of the bore corresponds to the diameter of the spigot.

26. A method of forming a joint for an aircraft assembly, the method comprising:
aligning a first joint part comprising a spigot with a second joint part comprising a housing and a floating socket in an interior of the housing, wherein the floating socket defines a sleeve with a spigot-receiving bore extending through the sleeve;
inserting the spigot into the floating socket as the second joint part is arranged to be brought together with the first joint; and
curing a curable medium in the interior of the housing to contact between the housing and the floating socket.

27. The method of claim 26 comprising, following inserting the spigot into the floating socket, injecting the curable medium in the interior of the housing.

28. The method of claim 26, wherein the floating socket defines a sleeve with a spigot receiving bore extending through the sleeve, and
wherein inserting the spigot into the spigot-receiving bore of the floating socket aligns the spigot with the sleeve.

* * * * *